United States Patent Office

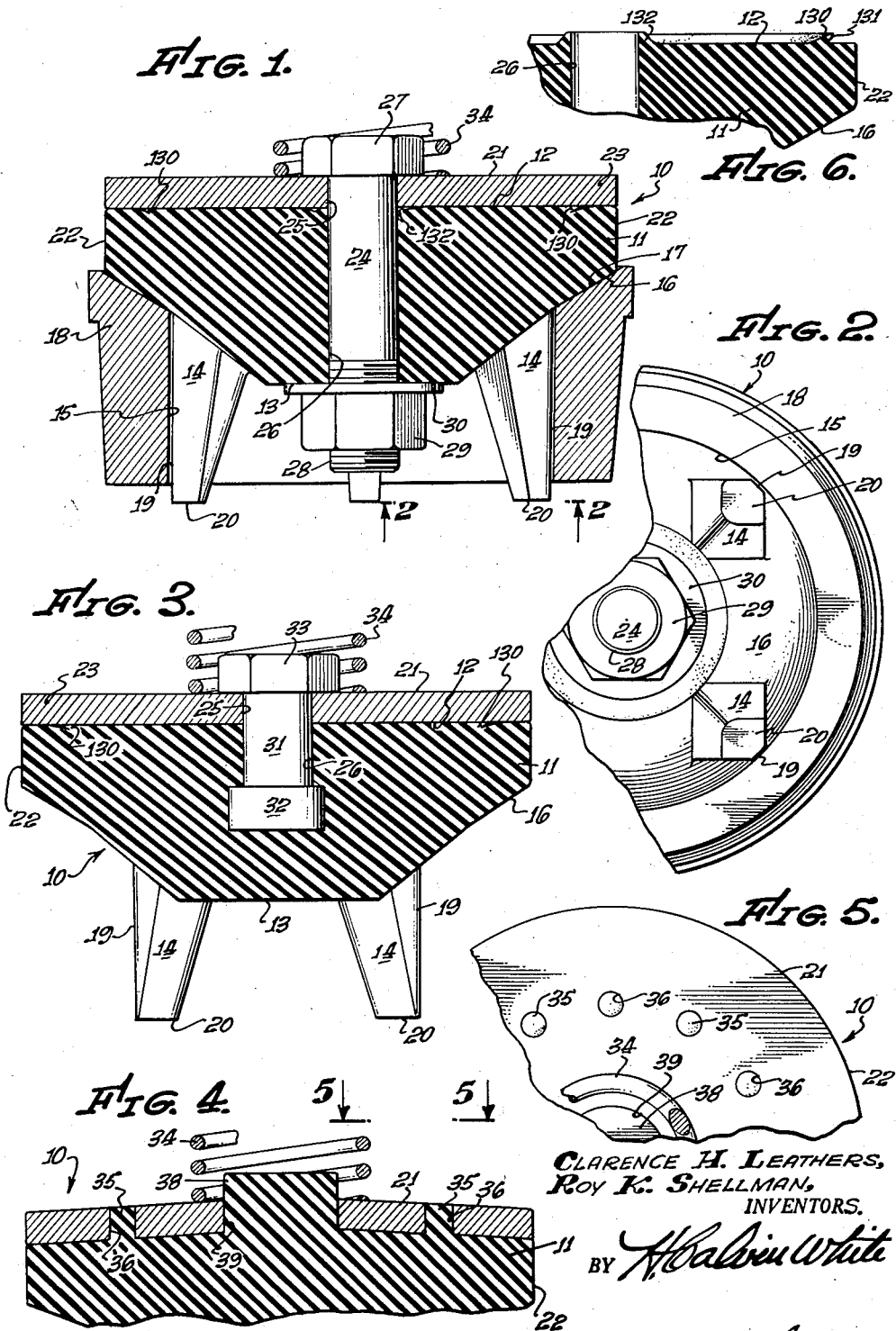

2,888,238
Patented May 26, 1959

2,888,238

PUMP VALVES

Clarence H. Leathers, Redondo Beach, and Roy K. Shellman, Compton, Calif., assignors to MacClatchie Manufacturing Company, Compton, Calif., a corporation of California Application November 18, 1954, Serial No. 469,724

7 Claims. (Cl. 251—358)

This invention relates to an improved valve of the type used in oil well surface pumps, and more specifically concerns a valve of this type in which the valve body and valve guide structure are formed of an elastomeric material in order to preclude abrasion and wear of the valve seat by mud particles and to materially lengthen the useful line of the valve and seat.

It has been found in practice that the efficient working life of mud pump valve structure having metallic surfaces repeatedly seating against one another in use, is undesirably shortened by rapid wear and abrasion of these surfaces by mud particles. The extremely high unit pressures existing between interengaging metallic surfaces of the valve and valve seat operate to squeeze abrasive particles trapped between these surfaces into the metal, resulting in rapid deterioration and wear of the surfaces.

The present invention, in which the valve body and valve guide fingers are preferably formed of elastomeric material such as natural or synthetic rubber, has for its primary purpose the elimination of rapid wear of valve structure. In accordance with the invention, all of the valve surfaces which come into engagement with seat structure and which move proximate to the valve port wall are formed of relatively hard rubber so that any abrasive particles caught between them will not be squeezed into the metal, but will rather deflect the rubber surface of the valve and be housed until the valve opens to relieve the pressures and to expel the particles.

If any mud particles become trapped between the rubber guide fingers and the metal wall of the valve port, they likewise will deflect surface portions of the fingers instead of being pressed into the metal of the walls by the relative sliding movement of the fingers past the walls. In this way, detrimental abrasion is effectively prevented.

It is another purpose of the invention to provide a rigid member such as a transverse metal plate carried by the elastomeric valve body opposite the seat and the fingers in order to absorb the high compressive loads exerted upon the valve body through the seat structure. Preferably the metal plate extends laterally to the side of the valve body to effectively absorb the seating loads exerted across the valve body to prevent undesirable deflection of the elastomeric body near its edges. Means are provided for connecting the rigid plate to the top surface of the valve body to form an integral valve structure capable of withstanding the high pressures involved in mud pump operation. The latter means preferably comprises a bolt extending through the rigid plate and into the valve body at its center so as to connect these elements in such a way as to distribute the loading symmetrically with respect to the axis of valve action.

Other features and objects of the invention, as well as the details of several typical and illustrative embodiments, will be more fully understood from the following detailed description of the accompanying drawing, in which:

Fig. 1 is a cross-sectional and elevational view of the mud pump valve and valve seat;

Fig. 2 is a fragmentary view taken on line 2—2 of Fig. 1;

Fig. 3 is a sectional and elevational view of a modified form of the mud pump valve;

Fig. 4 is a fragmentary and sectional view of another modified form of the invention;

Fig. 5 is a fragmentary plan view taken on line 5—5 of Fig. 4; and

Fig. 6 is a fragmentary section through the valve body as molded.

In Fig. 1 of the drawing, numeral 10 refers to a valve assembly including a circular valve body 11 having top and bottom surfaces 12 and 13 and four guide fingers 14 depending downward from the bottom surface 13 within a valve port 15. Both the valve body and the fingers are formed of an elastomeric material, preferably comprising a hard natural or synthetic rubber, and capable of withstanding unit pressures of the magnitude encountered in mud pump valve seating action. The bottom surface 13 includes an annular tapered face or shoulder 16 concentrically surrounding the fingers 14 and extending upwardly and outwardly therefrom to seat flushly against the tapered metallic valve seat 17 formed on valve seat body 18.

It will be understood that the rubber guide fingers 14 extend closely adjacent the wall of the valve port 15 so that as the valve 10 is reciprocated toward and away from the seat 17, the fingers may act to guide valve motion by coming into cushioning engagement with the port wall and thereby preventing lateral displacement of the valve. Any particles trapped between the outwardly facing surface 19 of a finger and the valve port wall will act to deflect the rubber surface, instead of being forced into the metal of the wall. Each of the fingers is tapered toward its free end 20 and toward the port wall to provide greater area between the fingers through which mud may flow during operation of the pump. Since the lower ends of the fingers are of smaller cross-section, their ability to deflect to accommodate abrasive particles is greater, and to that extent abrasive wear is likewise reduced.

A rigid metal plate 21 is positioned against the top surface 12 of the valve body 11 in order to prevent undesirable deflection of the valve body and to give the valve the strength needed to withstand the high pressures associated with valve seating. In order that reaction loads may be properly distributed over the transverse dimension of the valve body, the metal plate 21 is extended to the side 22 of the valve body opposite the seat 17. Compressive loads exerted upon the valve body by the seat 17 are taken in reaction by that portion 23 of the plate 21 opposite the seat, and maximum valve strength is thereby assured, in spite of the fact that there is no metal valve structure contacting the valve seat.

The metal plate 21 is connected to the rubber valve body 11 by means of a bolt 24 passing through central openings 25 and 26 in the plate and valve body respectively. The head 27 of the bolt bears against the upper surface of the plate 21, while the threaded lower end 28 projects through the bottom surface 13 of the valve body, and a nut 29 and washer 30 bearing against the under surface 13 retain the bolt in connecting condition. The bolt 24 is centrally positioned in the valve body so that plate 21 is held against the body at its center to provide for symmetrical distribution of loading on the plate 21.

In the as-molded condition, the rubber valve body 11 is formed as shown in Fig. 6 to include an outer annular seal 130 projecting upward from the top surface 12 of the body and inclined outward toward the side of the body in a taper terminating in a tip 131. The valve body also includes a central seal 132 surrounding bolt opening 26 and upstanding from the top surface of the body to an extent substantially equal to the vertical projection of annular seal 130. When the valve body is assembled to the plate 21 by bolt 24, the compressive loading between the plate and valve body operates to compress the seals 130 and 132 to the extent that the plate comes into compressive contact with other portions of the surface 12, as shown in Fig. 1. In this condition, greatest loading is against the seals 130 and 132, which act to prevent ingress of high pressure fluid between the valve body and plate to the uncompressed area between the bolt surface and wall of opening 26 in the body 11. In this way, leaking of high pressure fluid through the valve past the bolt is prevented.

Referring to Fig. 3, the valve parts similar to those shown in Fig. 1 are given the same numbers. The valve illustrated is very similar to that in Fig. 1, except for the provision of a modified bolt connection retaining the plate 21 against the top surface 12 of the valve body 11. The bolt 31 is again centrally located and extends through a central opening 25 in the plate and part way into the valve body. The lower end 32 of the bolt is flanged and embedded in the rubber body for anchoring purposes, and the bolt head 33 bears against the plate 21 to connect the latter to the valve body 11. As shown in both Figs. 1 and 3, a compression spring 34 bears against the surface of the plate 21 in concentric relation to the head of the bolt and acts to urge the valve 10 toward the valve seat 17.

In the embodiment shown in Figs. 4 and 5, the plate is connected to the top surface of the valve body 11 by means of a series of rubber projections 35 extending upward from the valve body 11 into holes 36 formed in the plate 21. Likewise, there is a central upstanding projection 38 of larger cross-section extending upward through a central opening 39 in the plate. These rubber projections may be conveniently molded in the openings within the plate when the valve body is formed, and in any event, the projections act to frictionally engage the metal walls of the openings in the plate and to connect the latter to the valve body. Projection 38 also serves to position the spring 34 in centered relation with respect to the plate 21.

We claim:

1. In combination with a mud pump annular valve seat having a cylindrical port opening axially rearwardly, an axially forwardly and rearwardly reciprocable mud pump valve, comprising a one-piece hard rubber body having a frustro-conical central body portion projecting axially forwardly within said port and through the seat when the valve body is closed thereagainst, said body including a plurality of elongated guide fingers extending forwardly within said port proximate to but radially spaced from the cylindrical wall thereof for free reciprocation of the valve, said fingers being circularly spaced about said axis with said circular spacing and the lengths of said fingers being substantially greater than any width dimension of the fingers throughout their length, rearward ends of said fingers being integral with the frustro-conical side of said central valve body portion and the inner sides of said fingers facing said axis tapering forwardly and away therefrom so that the finger forward portions have substantially reduced cross-sectional area in relation to the rearward ends thereof, said fingers being radially deflectible toward said axis on valve reciprocation by sand particles trapped in the spaces between said fingers and wall so that the particles are worked loose from said trapped condition and out of said spaces by said fingers in response to reciprocation and deflection thereof, said body including an annular shoulder extending outwardly from said fingers and facing said seat for sealing engagement thereagainst, a rigid reaction member carried by and extending across said body opposite said shoulder and said fingers, and means connecting said member to said body.

2. In combination with a mud pump annular valve seat having a cylindrical port opening axially rearwardly, an axially forwardly and rearwardly reciprocable mud pump valve, comprising a one-piece hard rubber body having a frusto-conical central body portion projecting axially forwardly within said port and through the seat when the valve body is closed thereagainst, said body including a plurality of elongated guide fingers extending forwardly within said port proximate to but radially spaced from the cylindrical wall thereof for free reciprocation of the valve, said fingers being circularly spaced about said axis with said circular spacing and the lengths of said fingers being substantially greater than any width dimension of the fingers throughout their length, rearward ends of said fingers being integral with the frusto-conical side of said central valve body portion and the inner sides of said fingers facing said axis tapering forwardly and away therefrom so that the finger forward portions have substantially reduced cross-sectional area in relation to the rearward ends thereof, said fingers being radially deflectible toward said axis on valve reciprocation by sand particles trapped in the spaces between said fingers and wall so that the particles are worked loose from said trapped condition and out of said spaces by said fingers in response to reciprocation and deflection thereof, said body including an annular shoulder extending between said fingers and the outer side of the body with said shoulder facing said seat for sealing engagement thereagainst, a rigid reaction member carried by said body and extending across said body at the rear thereof opposite said shoulder and said fingers, and a bolt extending through said member and into said body from the rear thereof connecting said member and body.

3. In combination with a mud pump annular valve seat having a cylindrical port opening axially rearwardly, an axially forwardly and rearwardly reciprocable mud pump valve, comprising a one-piece hard rubber body having a frusto-conical central body portion projecting axially forwardly within said port and through the seat when the valve body is closed thereagainst, said body including a plurality of elongated guide fingers extending forwardly within said port proximate to but radially spaced from the cylindrical wall thereof for free reciprocation of the valve, said fingers being circularly spaced about said axis with said circular spacing and the lengths of said fingers being substantially greater than any width dimension of the fingers throughout their length, rearward ends of said fingers being integral with the frusto-conical side of said central valve body portion and the inner sides of said fingers facing said axis tapering forwardly and away therefrom so that the finger forward portions have substantially reduced cross-sectional area in relation to the rearward ends thereof, said fingers being radially deflectible toward said axis on valve reciprocation by sand particles trapped in the spaces between said fingers and wall so that the particles are worked loose from said trapped condition and out of said spaces by said fingers in response to reciprocation and deflection thereof, said body including a tapered annular shoulder extending between said fingers and the outer side of the body with said shoulder facing said seat for sealing engagement thereagainst, a metallic plate extending in a flat plane and bearing flatly against said body at the rear thereof opposite said shoulder and fingers, and a bolt extending axially forwardly through said plate and into said body from the rear thereof connecting said plate with said body.

4. The invention as defined in claim 3 in which said body includes an integral annular projection at the rear side thereof held in compressed condition between said rear side and plate and sealing off therebetween to prevent entrance of mud between said body and plate.

5. The invention as defined in claim 4 in which said body includes another projection concentric with said integral annular projection extending away from said axis and spaced radially inwardly from but proximate to the outer side of said body.

6. The invention as defined in claim 4 in which said projection extends adjacent said bolt.

7. The invention as defined in claim 3 in which said body includes a pair of integral concentric projections at the rear side thereof held in compressed condition between said rear side and plate and sealing off therebetween to prevent entrance of mud between said body and plate, one of said projections extending away from said axis in radially inwardly spaced but proximate relation to the outer side of said body and the other projection extending adjacent said bolt.

References Cited in the file of this patent

UNITED STATES PATENTS

| | | |
|---|---|---|
| 1,274,680 | Calvert | Aug. 6, 1918 |
| 1,476,985 | Kollberg | Dec. 11, 1923 |
| 1,949,874 | Patterson | Mar. 6, 1934 |
| 2,093,662 | Steirly | Sept. 21, 1937 |
| 2,116,968 | Casner | May 10, 1938 |
| 2,194,960 | Walker | Mar. 26, 1940 |
| 2,327,600 | Kennon | Aug. 24, 1943 |
| 2,521,314 | Therolf | Sept. 5, 1950 |
| 2,544,498 | Hiertz | Mar. 6, 1951 |

FOREIGN PATENTS

| | | |
|---|---|---|
| 280,483 | Great Britain | Nov. 17, 1927 |
| 397,542 | Great Britain | Aug. 28, 1933 |
| 626,030 | Great Britain | July 7, 1949 |

UNITED STATES PATENT OFFICE

CERTIFICATE OF CORRECTION

Patent No. 2,888,238                                                     May 26, 1959

Clarence H. Leathers et al.

It is hereby certified that error appears in the printed specification of the above numbered patent requiring correction and that the said Letters Patent should read as corrected below.

Column 3, line 65, for "said particles" read -- sand particles --.

Signed and sealed this 10th day of November 1959.

(SEAL)
Attest:

KARL H. AXLINE                                            ROBERT C. WATSON
Attesting Officer                                        Commissioner of Patents